(12) United States Patent
Dowens

(10) Patent No.: US 7,333,596 B1
(45) Date of Patent: Feb. 19, 2008

(54) CASUAL USAGE ALTERNATE BILLING

(75) Inventor: Jac P. Dowens, Red Bank, NJ (US)

(73) Assignee: AT&T Corp., New York, NY (US)

( * ) Notice: Subject to any disclaimer, the term of this patent is extended or adjusted under 35 U.S.C. 154(b) by 1429 days.

(21) Appl. No.: 10/247,900

(22) Filed: Sep. 20, 2002

(51) Int. Cl.
*H04M 15/00* (2006.01)

(52) U.S. Cl. .............................. 379/114.2; 379/114.17; 379/114.26; 379/115.02; 379/121.01; 379/127.03

(58) Field of Classification Search ................ 379/111, 379/112.07, 112.09, 114.01, 114.15, 114.19, 379/114.2, 114.24, 114.26, 115.01–115.02, 379/121.01, 121.03, 121.05
See application file for complete search history.

(56) References Cited

U.S. PATENT DOCUMENTS

| | | | |
|---|---|---|---|
| 5,781,620 A * | 7/1998 | Montgomery et al. . | 379/114.02 |
| 5,850,432 A | 12/1998 | Desai et al. | |
| 6,404,871 B1 | 6/2002 | Springer et al. | |
| 7,254,222 B1 * | 8/2007 | Bauer et al. ............. | 379/114.2 |

* cited by examiner

*Primary Examiner*—Binh K. Tieu

(57) ABSTRACT

The present invention relates generally to a casual usage alternate billing. More particularly, the invention encompasses a method and an apparatus for casual usage alternate billing. The invention intercepts a call, especially a dial-around call, to either verify the existence of information in a database or to obtain and authenticate a mode of payment prior to allowing the call to proceed.

21 Claims, 2 Drawing Sheets

CASUAL USAGE ALTERNATE BILLING

FIELD OF THE INVENTION

The present invention relates generally to a casual usage alternate billing. More particularly, the invention encompasses a method and an apparatus for casual usage alternate billing. The invention intercepts a call, especially a dial-around call, to either verify the existence of information in a database or to obtain and authenticate a mode of payment prior to allowing the call to proceed.

BACKGROUND INFORMATION

Virtually every business requires that potential customer's credit worthiness be known prior to extension of credit. Wireless carriers and Local Exchange Carriers (LECs) all require a customer application and authentication prior to granting network access. However, Inter-Exchange Carriers (IXCs) are the only entities in the telecommunications industry that allow unknown parties to place calls without credit worthiness information by providing dial-around access to their networks. This results in additional revenue but also exposes the IXCs to experience fraud and uncollectible debts, which could be in excess of millions of dollars per year, due to the present access methods.

Additionally, more and more telecommunications carriers are becoming "any distance" providers and thus they are all facing this problem and are also working toward various solutions to prevent fraud and secure revenues.

With this invention, any telecommunication provider will be able to eliminate the fraud losses, as well as increase revenues.

PURPOSES AND SUMMARY OF THE INVENTION

The invention is a novel method and an apparatus for casual usage alternate billing.

Therefore, one purpose of this invention is to provide an apparatus and a method that will provide a casual usage alternate billing.

Another purpose of this invention is to provide a caller with an alternate billing method.

Still another purpose of this invention is to eliminate fraud.

Yet another purpose of this invention is to increase collections from the dial-around calls.

Still yet another purpose of the invention is to allow a platform to determine if an alternate billing method is needed for all calls that are placed.

Therefore, in one aspect this invention comprises a casual usage alternate billing method comprising the steps of:

(a) intercepting a dial-around call placed from a first communication device to at least one second communication device;

(b) checking at least a portion of information from the first communication device against a first database;

(c) allowing the call to proceed if information exists for the first communication device in the database or allowing the first communication device to provide additional information to continue the call.

In another aspect this invention comprises an apparatus for casual usage alternate billing comprising:

(a) at least one means for intercepting a dial-around call placed from a first communication device to at least one second communication device;

(b) at least one means for checking at least a portion of information from the first communication device against a first database;

(c) means for allowing the call to proceed if information exists for the first communication device in the database or allowing the first communication device to provide additional information to continue the call.

In yet another aspect this invention comprises a program storage device readable by machine, tangibly embodying a program of instructions executable by the machine to perform method steps for casual usage alternate billing, the method steps comprising:

(a) intercepting a dial-around call placed from a first communication device to at least one second communication device;

(b) checking at least a portion of information from the first communication device against a first database;

(c) allowing the call to proceed if information exists for the first communication device in the database or allowing the first communication device to provide additional information to continue the call.

BRIEF DESCRIPTION OF THE DRAWINGS

The features of the invention believed to be novel and the elements characteristic of the invention are set forth with particularity in the appended claims. The drawings are for illustration purposes only and are not drawn to scale. Furthermore, like numbers represent like features in the drawings. The invention itself, however, both as to organization and method of operation, may best be understood by reference to the detailed description which follows taken in conjunction with the accompanying drawings in which:

DETAILED DESCRIPTION

The present invention uses network switches and database(s) to route a caller to a platform needed for alternate billing. For example, when a caller dials a 1+direct distance dialed LD (Long Distance) number such as a dial-around number, for example 1010, with a Carrier Identifier Code (CIC) XXX, the call "1010XXX" is routed to an inter-toll switch. With this invention, an appropriate switch sends a query to at least one network database containing all approved customers. The query also contains the caller's ANI (Automatic Number Identifier). If the ANI is not present in the database, it would signify that either the caller is not a customer or is a customer who is not on an approved list within the routed database; thus the call needs to be routed to a platform for alternate billing. The platform then will require the caller to provide a commercial credit card, a debt card or any other valid means of payment, such as a calling card or a third party payer, to name a few. Using this invention, the caller may also be given the option to purchase a pre-paid calling card with a valid commercial credit card or any other valid means of payment.

Figure 1:
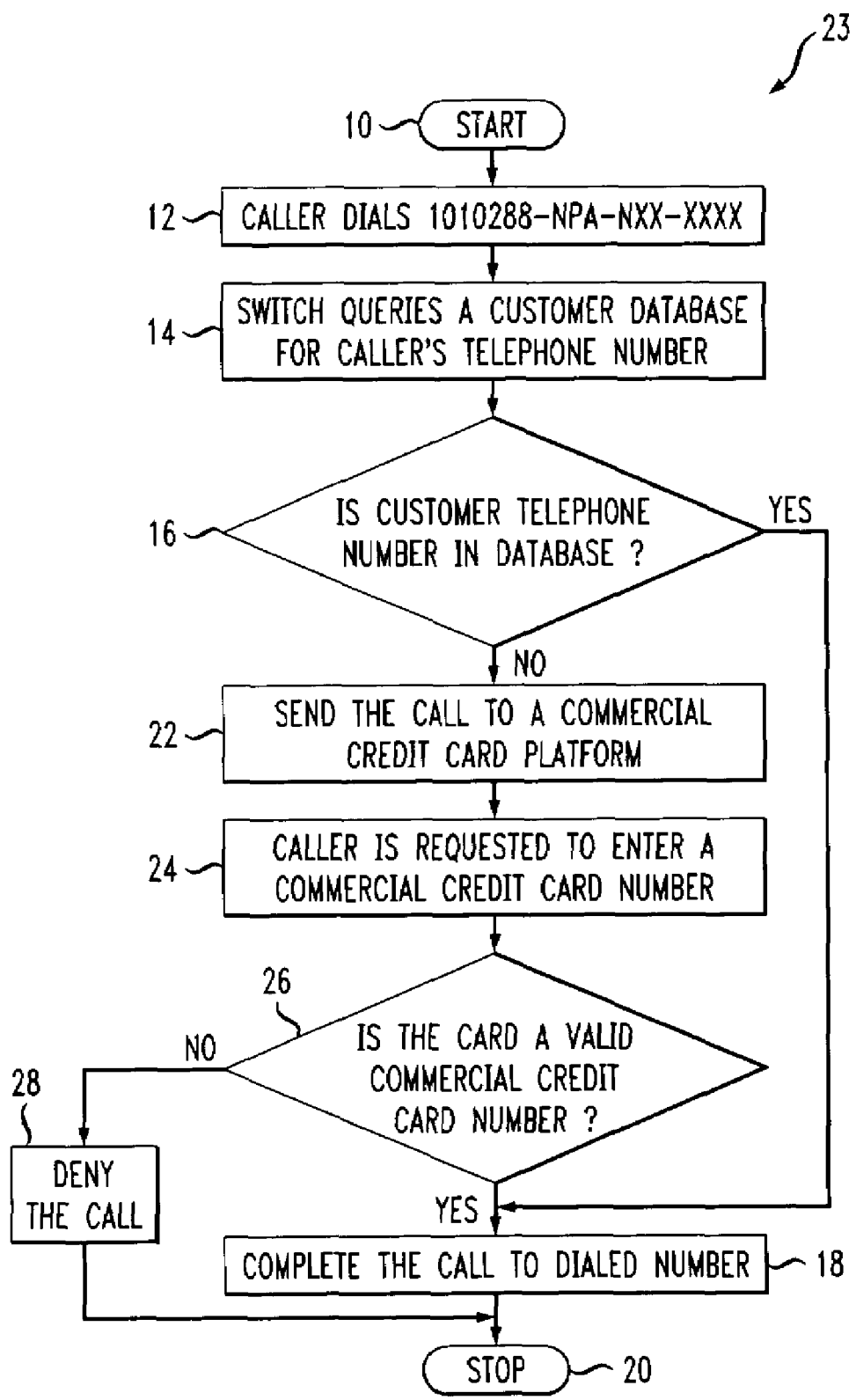
FIG. 1 is an exemplary flow diagram to illustrate an embodiment of the present invention.

FIG. 1 is an exemplary flow diagram to illustrate an embodiment of the present invention. At step 10 the casual usage alternate billing architecture 23 is initiated. At step 12 the caller dials, for example, 1010ATT-NPA-NXX-XXXX, where 1010 is the dial-around number, ATT or 288 is the Carrier Identifier Code (CIC), NPA is the National Public Access (NPA) number or "area code", NXX is the Local Exchange Carrier (LEC) number while XXXX is the Called Party Number (CdPn). At step 14 the switch queries a customer database for the caller's telephone number. If the customer telephone number is in the database, then at step 16 the call is allowed to proceed to step 18. However, if at step 16 the customer telephone number is not in the database, or is not on an approved list within the database, the call is then routed to a platform for further process using step 22. At step 18 the call is allowed to proceed to the dialed number until either the calling party (CgP) or the called party (CdP) terminates the call at step 20.

At step 22 the call is sent to a platform, such as a commercial credit card platform. At step 24 the caller is requested to enter a mode of payment, such as a commercial credit card number. At step 26 the platform will validate the payment, such as verifying that the commercial credit card number is valid and activating the billing protocols. If, at step 26, the commercial credit card number is determined to be valid, then the call is routed and completed at step 18 until either the calling party (CgP) or the called party (CdP) terminates the call at step 20. However, if it is determined, at step 26 that the mode of payment, such as the commercial credit card number, is not valid, then the caller is denied further processing of the call at step 28 and the call is stopped at step 20.

In another embodiment of this invention, the caller at step 28 after being denied the further continuation of the call may be given an option to provide another mode of payment for the call to continue so that the call could be routed and completed until it is terminated.

Figure 2A:
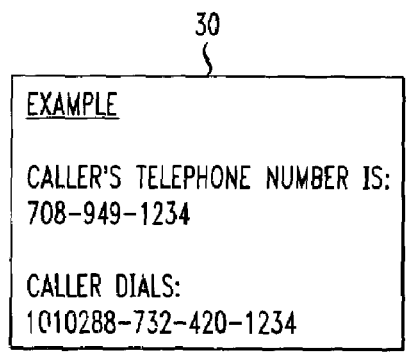
FIG. 2A illustrates an example of data for use in the present invention.

FIG. 2A illustrates an example of data 30 for use in the present invention where a caller uses a first telecommunication device having, for example, a phone number 708-949-1234 (CgPn) (Calling Party Number) to call a second telecommunication device having, for example, a phone number 732-420-1234 (CdPn) (Called Party Number), using a dial-around number 1010, and using CIC 288.

Figure 2B:
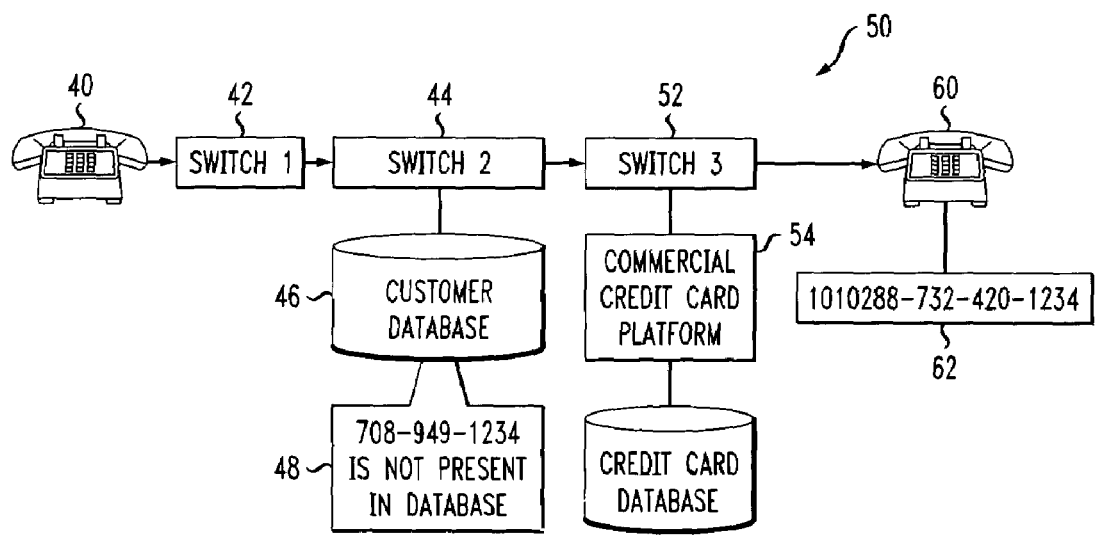
FIG. 2B is an exemplary apparatus and process to illustrate the present invention.

FIG. 2B is an exemplary apparatus and process to illustrate the present invention. The casual usage alternate billing architecture 50 is initiated when a caller uses telecommunication device 40, such as a telephone, a cellular phone, a lap-top, a PDA, to name a few, to contact another telecommunication device 60, such as a telephone, a cellular phone, a laptop, a PDA, to name a few, by dialing numbers 62. The call from device 40 is routed to a first switch 42, such as an IXC (Inter-Exchange Carrier), a LEC (Local Exchange Carrier), a LAN (Local Area Network), a WAN (Wide Area Network), a PBX (Private Branch Exchange), to name a few, and then is connected to a second switch 44, such as an IXC (Inter-Exchange Carrier), a LEC (Local Exchange Carrier), a LAN (Local Area Network), a WAN (Wide Area Network), a PBX (Private Branch Exchange), to name a few. At either, switch 42 or switch 44, or anywhere along the communication path, the calling party number of the device 40, such as 708-949-1234 (CgPn), is checked against a customer database 46. The calling party number (CgPn) of the device 40 could be a phone number or any other device or customer identification number. For the purposes of illustration FIGS. 2A and 2B are using 708-949-1234 (CgPn) as the phone number or device identification number for the first communication device 40 and are using 732-420-1234 (CdPn) as the phone number or device identification number for the second communication device 60. The customer database 46 checks whether or not the device or customer information exists for device 40. The results are then sent back to switch 44. If the device or customer information exists for device 40, then the call is allowed to proceed to the communication device 60. However, if the device or customer information does not exists for device 40, then the call is not allowed to proceed and is routed to a platform 54, such as a commercial credit card platform 54 via a third switch 52. In the example, the data base query 48 verifies that the phone number or device identification number 708-949-1234 (CgPn) for the communication device 40 is not present in the database 46. The commercial credit card platform 54 then requests call payment information from the caller of device 40. Upon receipt of the mode of payment, the platform 54 verifies the payment information from a database 56, such as a credit card database 56. Upon verification and authentication of the mode of payment from the database 56, the call from the caller of device 40 is allowed to proceed and connected to the communication device 60. Upon termination of the call, the database 56 is instantaneously charged for the call.

Therefore, using the present invention when the caller uses a first telecommunication device 40—having, for example, the phone number 708-949-1234—to call the second telecommunication device 60—having, for example, the phone number 732-420-1234—the system automatically intercepts the call to check, for example, whether or not the phone number 708-949-1234 is in the database. If it is in the database, then the call is allowed to proceed, because upon the connection and termination of the call the phone number 708-949-1234 can be billed for the call. However, in our example the phone number 708-949-1234 is not in the database, therefore the connection is put on "hold" while the system attempts to get payment information. The caller from the first telecommunication device 40 could provide a valid commercial credit card, a debit card or any other valid means of payment, such as a calling card, a pre-paid calling card, a third party payer, to name a few, or even change the call as a collect call to be billed and paid by the operator of the second telecommunication device 60 having, for example, the phone number 732-420-1234.

With this invention, fraud will be eliminated because a valid form of billing is required. Additionally, revenues will increase because the LD provider will not need to interact with LECs and CLECs to find the caller's billing name and address. The additional steps to locate the original caller can take months and considerable expense to collect for the original call. Additionally, in some states (e.g., California) the BPU (Board of Public Utilities) requires that the service provider, such as a telecommunication carrier, must submit their bill to the caller within a fixed period of time—such as 90 days—or forfeit the revenue.

This invention is also applicable when an individual who is not an IXC (Inter-Exchange Carrier) customer places a 1+ call using 1010 (IXC's prefix number) as the prefix. The switch 42 or 44 will look at a database 46, such as a customer database 46, to see if the caller's ANI (Automatic Number Identifier) for the device 40 is subscribed to the telecommunication carrier, such as, AT&T. If the ANI for the device 40 is not in the database 46, then the call will be re-routed to a platform 54 for alternate billing, such as, a commercial credit card platform 54 or a Pre-Paid card platform (not shown) via a third switch 52. It should be appreciated that the Pre-Paid card platform may offer the caller an option to purchase a pre-paid card using, for example, a commercial credit card, or to add more minutes to the pre-existing calling card using, for example, a commercial credit card.

With this invention, the mode of payment is secured prior to the connection of the call and the billing for the call can take place immediately upon termination of the call; this is especially important for the dial-around calls.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A casual usage alternate billing method comprising the steps of:
    (a) intercepting a dial-around call placed from a first communication device to at least one second communication device;
    (b) checking at least a portion of information from the first communication device against a first database;
    (c) allowing the call to proceed if information exists for the first communication device in the database or allowing the first communication device to provide additional information to continue the call.

2. The casual usage alternate billing method of claim 1, wherein at least a portion of information from the first communication device is the phone number of the first communication device.

3. The casual usage alternate billing method of claim 1, wherein the additional information from the first communication device is a mode of payment.

4. The casual usage alternate billing method of claim 3, wherein the mode of payment is selected from a group consisting of a credit card, a debit card, a calling card, a pre-paid calling card and a third party payment arrangement.

5. The casual usage alternate billing method of claim 3, wherein the mode of payment for the call is billed immediately upon the termination of the call.

6. The casual usage alternate billing method of claim 1, wherein the call is terminated if the first communication device is unable to provide additional information.

7. The casual usage alternate billing method of claim 1, wherein the additional information is verified and authenticated before the call is allowed to proceed.

8. The casual usage alternate billing method of claim 1, wherein the call from the first communication device to the at least one second communication device is intercepted prior to the completion of the call.

9. The casual usage alternate billing method of claim 1, wherein the first communication device is selected from a group consisting of a telephone, a cellular phone, a lap-top and a PDA.

10. The casual usage alternate billing method of claim 1, wherein the second communication device is selected from a group consisting of a telephone, a cellular phone, a lap-top and a PDA.

11. An apparatus for casual usage alternate billing comprising:
    (a) at least one means for intercepting a dial-around call placed from a first communication device to at least one second communication device;
    (b) at least one means for checking at least a portion of information from the first communication device against a first database;
    (c) means for allowing the call to proceed if information exists for the first communication device in the database or allowing the first communication device to provide additional information to continue the call.

12. The apparatus of claim 11, wherein at least a portion of information from the first communication device is the phone number of the first communication device.

13. The apparatus of claim 11, wherein the additional information from the first communication device is a mode of payment.

14. The apparatus of claim 13, wherein the mode of payment is selected from a group consisting of a credit card, a debit card, a calling card, a pre-paid calling card and a third party payment arrangement.

15. The apparatus of claim 13, wherein the mode of payment for the call is billed immediately upon the termination of the call.

16. The apparatus of claim 11, wherein the call is terminated if the first communication device is unable to provide additional information.

17. The apparatus of claim 11, wherein the additional information is verified and authenticated before the call is allowed to proceed.

18. The apparatus of claim 11, wherein the call from the first communication device to the at least one second communication device is intercepted prior to the completion of the call.

19. The apparatus of claim 11, wherein the first communication device is selected from a group consisting of a telephone, a cellular phone, a lap-top and a PDA.

20. The apparatus of claim 11, wherein the second communication device is selected from a group consisting of a telephone, a cellular phone, a lap-top and a PDA.

21. A program storage device readable by machine, tangibly embodying a program of instructions executable by the machine to perform method steps for casual usage alternate billing, the method steps comprising:
    (a) intercepting a dial-around call placed from a first communication device to at least one second communication device;
    (b) checking at least a portion of information from the first communication device against a first database;
    (c) allowing the call to proceed if information exists for the first communication device in the database or allowing the first communication device to provide additional information to continue the call.

* * * * *